US010796313B2

(12) United States Patent
Olliphant et al.

(10) Patent No.: US 10,796,313 B2
(45) Date of Patent: *Oct. 6, 2020

(54) METHOD AND SYSTEM FOR FACILITATING ONLINE PAYMENTS BASED ON AN ESTABLISHED PAYMENT AGREEMENT

(71) Applicant: PAYPAL, INC., San Jose, CA (US)

(72) Inventors: Hugo Olliphant, San Francisco, CA (US); Franck Chastagnol, Redwood City, CA (US); Yi-Ling Su, Los Altos, CA (US); William Wu, San Francisco, CA (US); Chris Brown, Berkeley, CA (US); Thach Dang, Burlingame, CA (US); Thomas Veino, San Jose, CA (US); Carol Gunby, San Jose, CA (US); Peter Zhe Chu, Santa Clara, CA (US); Steven Chen, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 80 days.

This patent is subject to a terminal disclaimer.

(21) Appl. No.: 15/949,429

(22) Filed: Apr. 10, 2018

(65) Prior Publication Data

US 2019/0005497 A1 Jan. 3, 2019

Related U.S. Application Data

(63) Continuation of application No. 15/091,199, filed on Apr. 5, 2016, now Pat. No. 9,940,622, which is a
(Continued)

(51) Int. Cl.
*G06Q 40/00* (2012.01)
*G06Q 20/40* (2012.01)
(Continued)

(52) U.S. Cl.
CPC ........... *G06Q 20/405* (2013.01); *G06Q 20/02* (2013.01); *G06Q 20/10* (2013.01); *G06Q 20/102* (2013.01); *G06Q 20/12* (2013.01); *G06Q 40/00* (2013.01)

(58) Field of Classification Search
CPC ........ G06Q 10/00; G06Q 20/00; G06Q 30/00; G06Q 40/00
(Continued)

(56) References Cited

U.S. PATENT DOCUMENTS 5,426,281 A 6/1995 Abecassis
5,575,518 A 11/1996 Payne
(Continued)

FOREIGN PATENT DOCUMENTS

GB 2360380 9/2001
TW 381240 2/2000
(Continued)

OTHER PUBLICATIONS

U.S. Appl. No. 94/109,697 Office Action dated Oct. 5, 2009, 9 pgs.
(Continued)

*Primary Examiner* — Frantzy Poinvil

(57) ABSTRACT

A method and system for facilitating online payments are disclosed. According to one aspect of the present invention, a payment agreement is established at a payment service provider that defines terms of a payment relationship between a merchant and a user. The establishing of the payment agreement includes linking the payment agreement with a payment account of the merchant or user stored at the payment service provider. After establishing the payment agreement, a payment request associated with a transaction is received, whereby the payment request includes a unique identifier to identify the payment agreement stored at the payment service provider. Based on a verification that the
(Continued)

payment request complies with terms of the payment agreement, the payment request is processed.

20 Claims, 6 Drawing Sheets

Related U.S. Application Data continuation of application No. 13/458,855, filed on Apr. 27, 2012, now Pat. No. 9,317,841, which is a continuation of application No. 10/873,704, filed on Jun. 21, 2004, now Pat. No. 8,175,938.

(60) Provisional application No. 60/562,065, filed on Apr. 13, 2004.

(51) Int. Cl.
  *G06Q 20/02* (2012.01)
  *G06Q 20/10* (2012.01)
  *G06Q 20/12* (2012.01)

(58) Field of Classification Search
  USPC ........................................... 705/3–44
  See application file for complete search history.

(56) References Cited

U.S. PATENT DOCUMENTS

| | | | |
|---|---|---|---|
| 5,649,118 A | 7/1997 | Carlisle et al. | |
| 5,699,528 A | 12/1997 | Hogan | |
| 5,778,178 A | 7/1998 | Arunachalam | |
| 5,826,241 A | 10/1998 | Stein et al. | |
| 5,883,810 A | 3/1999 | Franklin et al. | |
| 5,903,830 A | 5/1999 | Joao et al. | |
| 5,903,878 A | 5/1999 | Talati et al. | |
| 5,920,847 A | 7/1999 | Kolling | |
| 5,987,500 A | 11/1999 | Arunachalam | |
| 6,018,724 A | 1/2000 | Arent | |
| 6,047,268 A | 4/2000 | Bartoli et al. | |
| 6,167,385 A | 12/2000 | Hartley-Urquhart | |
| 6,205,433 B1 | 3/2001 | Boesch et al. | |
| 6,212,556 B1 | 4/2001 | Arunachalam | |
| 6,314,519 B1 | 11/2001 | Davis et al. | |
| 6,336,114 B1 | 1/2002 | Garrison | |
| 6,473,740 B2 | 10/2002 | Cockrill et al. | |
| 6,675,153 B1 | 1/2004 | Cook | |
| 6,901,387 B2 | 5/2005 | Wells et al. | |
| 6,934,692 B1 | 8/2005 | Duncan | |
| 6,996,542 B1 | 2/2006 | Landry | |
| 7,013,001 B1 | 3/2006 | Felger | |
| 7,051,001 B1 | 5/2006 | Slater | |
| 7,240,031 B1 | 7/2007 | Kight et al. | |
| 7,353,203 B1 | 4/2008 | Kriplani et al. | |
| 7,502,760 B1 | 3/2009 | Gupta | |
| 7,537,153 B2 | 5/2009 | Hurwitz et al. | |
| 7,606,787 B2* | 10/2009 | Keown | G06Q 20/00 |
| 7,627,526 B2 | 12/2009 | Williams et al. | |
| 7,660,766 B1 | 2/2010 | Lawson et al. | |
| 7,716,128 B2* | 5/2010 | Diveley | G06Q 20/02 |
| | | | 705/39 |
| 7,742,994 B1 | 6/2010 | Gupta | |
| 7,792,749 B2 | 9/2010 | Ganesan | |
| 7,814,013 B2 | 10/2010 | Morsillo et al. | |
| 7,814,017 B2* | 10/2010 | Vancini | G06Q 20/10 |
| | | | 705/34 |
| 7,815,107 B2* | 10/2010 | Kingsborough | G06Q 20/10 |
| | | | 235/380 |
| 7,953,660 B2 | 5/2011 | Ganesan et al. | |
| 8,135,621 B2 | 3/2012 | Vishik | |
| 8,175,938 B2 | 5/2012 | Olliphant et al. | |
| 8,352,364 B2 | 1/2013 | Reardon | |
| 8,527,413 B2* | 9/2013 | Heller | G06Q 20/102 |
| | | | 705/35 |
| 8,655,786 B2 | 2/2014 | Lakkapragada | |
| 8,682,784 B2 | 3/2014 | Schleicher | |
| 8,738,517 B2 | 5/2014 | Bedier et al. | |
| 8,762,211 B2* | 6/2014 | Killian | G06Q 20/0855 |
| | | | 705/17 |
| 9,317,841 B2 | 4/2016 | Olliphant et al. | |
| 9,940,622 B2 | 4/2018 | Olliphant et al. | |
| 2002/0040350 A1 | 4/2002 | Shinzaki | |
| 2002/0052841 A1 | 5/2002 | Guthrie et al. | |
| 2002/0087469 A1 | 7/2002 | Ganesan et al. | |
| 2002/0111886 A1 | 8/2002 | Chenevich | |
| 2002/0111915 A1 | 8/2002 | Clemens | |
| 2003/0154139 A1 | 8/2003 | Woo | |
| 2003/0216996 A1 | 11/2003 | Cummings et al. | |
| 2004/0139008 A1 | 7/2004 | Mascavage, III | |
| 2005/0075979 A1 | 4/2005 | Leavitt et al. | |
| 2005/0177510 A1 | 8/2005 | Hilt et al. | |
| 2005/0228750 A1 | 10/2005 | Olliphant et al. | |
| 2006/0036541 A1 | 2/2006 | Schleicher | |
| 2006/0036544 A1 | 2/2006 | Dharam | |
| 2006/0065717 A1 | 3/2006 | Hurwitz et al. | |
| 2006/0122943 A1 | 6/2006 | Mann, III et al. | |
| 2006/0131387 A1 | 6/2006 | Hansen | |
| 2007/0022049 A1* | 1/2007 | Diveley | G06Q 20/02 |
| | | | 705/39 |
| 2007/0083460 A1 | 4/2007 | Bachenheimer | |
| 2007/0233599 A1 | 10/2007 | Ganesan et al. | |
| 2007/0244809 A1 | 10/2007 | Meeks | |
| 2008/0040274 A1 | 2/2008 | Uzo | |
| 2008/0140531 A1 | 6/2008 | Diveley et al. | |
| 2008/0162366 A1 | 7/2008 | Bedier et al. | |
| 2009/0094125 A1* | 4/2009 | Killian | G06Q 20/0855 |
| | | | 705/17 |
| 2009/0307140 A1* | 12/2009 | Mardikar | G06Q 20/20 |
| | | | 705/71 |
| 2012/0191602 A1* | 7/2012 | Wright | G06Q 20/04 |
| | | | 705/40 |
| 2012/0215697 A1 | 8/2012 | Olliphant et al. | |
| 2012/0271761 A1 | 10/2012 | Kight et al. | |
| 2013/0197991 A1* | 8/2013 | Basu | G06Q 30/0239 |
| | | | 705/14.39 |
| 2014/0101038 A1 | 4/2014 | Ganesan | |
| 2014/0172717 A1 | 6/2014 | Bedier et al. | |
| 2014/0195436 A1 | 7/2014 | Schleicher | |
| 2015/0052009 A1* | 2/2015 | Ketchell, III | G06Q 30/0633 |
| | | | 705/26.8 |
| 2015/0112866 A1* | 4/2015 | Muthu | G06Q 20/385 |
| | | | 705/44 |
| 2016/0217468 A1 | 7/2016 | Olliphant et al. | |
| 2019/0005497 A1 | 1/2019 | Olliphant et al. | |

FOREIGN PATENT DOCUMENTS

| | | |
|---|---|---|
| TW | 498250 | 8/2002 |
| TW | 530230 | 5/2003 |
| TW | 532022 | 5/2003 |
| TW | 544605 | 8/2003 |
| WO | WO-9703410 | 1/1997 |
| WO | WO-0067219 | 11/2000 |
| WO | WO-0118720 | 3/2001 |
| WO | WO-0184454 | 11/2001 |
| WO | WO-2004079603 | 9/2004 |
| WO | WO-2005101264 | 10/2005 |
| WO | WO-2006019368 | 2/2006 |
| WO | WO-2005101264 | 11/2006 |
| WO | WO-2006019368 | 11/2007 |

OTHER PUBLICATIONS

U.S. Appl. No. 10/873,704, Response filed Jul. 15, 2010 to Final Office Action dated Apr. 15, 2010, 22 pgs.

U.S. Appl. No. 11/618,700, Advisory Action dated May 26, 2010, 4 pgs.

Canadian Application Serial No. 200580019391.0, Office Action dated Aug. 29, 2008, 6.

Chinese Application No. 200580019391.0, Office Action dated Mar. 24, 2009, 1 pg.

(56) References Cited

OTHER PUBLICATIONS

Chinese Application Serial No. 200580019391.0, Office Action dated Aug. 29, 2008, with English translation of claims, OAR-MISC, 7 pgs.
Chinese Application Serial No. 200580019391.0, Office Action dated Feb. 10, 2009, with English translation of claims, 6 pgs.
Chinese Application Serial No. 200580019391.0, Response filed Jan. 13, 2009 to Office Action dated Aug. 29, 2008, with English translation of claims, 16 pgs.
European Application Serial No. 05746764.9, Office Action dated Mar. 23, 2012, 32 pgs.
European Application Serial No. 05746764.9, Examination Report dated Mar. 18, 2009, 3 pgs.
European Application Serial No. 05746764.9, Final Written Submission filed Oct. 28, 2011, 8 pgs.
European Application Serial No. 05746764.9, Office Action dated Apr. 22, 2009, 4 pgs.
European Application Serial No. 05746764.9, Response filed Dec. 22, 2009 to Office Action dated Apr. 22, 2009, 13 pgs.
European Application Serial No. 05746764.9, Summons to Attend Oral Proceedings mailed Oct. 25, 2011, 8 pgs.
European Applocation Serial No. 05746764.9, Office Action dated Apr. 22, 2009, 4 pgs.
European Applocation Serial No. 05746764.9, Office Action Response Filed: Dec. 22, 2009, 13 pgs.
International Application Serial No. PCT/US2004/022742, International Preliminary Report on Patentability dated Oct. 25, 2007, 5 pgs.
International Application Serial No. PCT/US2004/022742, International Search Report dated Sep. 21, 2007, 2 pgs.
International Application Serial No. PCT/US2004/022742, Written Opinion dated Sep. 21, 2007, 3 pgs.
International Application Serial No. PCT/US2005/010827, International Preliminary Report on Patentability dated Oct. 26, 2006, 5 pgs.
International Application Serial No. PCT/US2005/010827, International Search Report dated Sep. 1, 2006, 2 pgs.
International Application Serial No. PCT/US2005/010827, Written Opinion dated Sep. 1, 2006, 3 pgs.
Taiwanese Application Serial No. 94109697, Notice of Allowance dated Jun. 2, 2010, with English translation, 5 pgs.
Taiwanese Application Serial No. 94109697, Notice of Allowance dated Jun. 2, 2010, 2 pgs.
Taiwanese Application Serial No. 94109697, Office Action dated Aug. 14, 2006, with English translation of claims, 9 pgs.
Taiwanese Application Serial No. 94109697, Office Action dated Feb. 5, 2006, with English translation of claims, 8 pgs.
Taiwanese Application Serial No. 94109697, Office Action dated Sep. 14, 2009, with English translation of claims, 9 pgs.
Taiwanese Application Serial No. 94109697, Office Action dated Feb. 9, 2006, 8 pgs.
Taiwanese Application Serial No. 94109697, Response filed Apr. 14, 2006 to Office Action dated Feb. 9, 2006, with English translation of claims, 108 pgs.
Taiwanese Application Serial No. 94109697, Response filed Jan. 22, 2010 to Office Action dated Sep. 14, 2009, with English translation of claims, 62 pgs.
U.S. Appl. No. 10/873,704, Advisory Action dated Aug. 29, 2011, 2 pgs.
U.S. Appl. No. 10/873,704, Appeal Brief filed Oct. 31, 2011, 36 pgs.
U.S. Appl. No. 10/873,704, Decision on Pre-Appeal Brief Request dated Oct. 17, 2011, 2 pgs.
U.S. Appl. No. 10/873,704, Decision on Pre-Appeal Brief Request mailed Oct. 17, 2011, 2 pgs.
U.S. Appl. No. 10/873,704, Final Office Action dated Apr. 15, 2010, 17 pgs.
U.S. Appl. No. 10/873,704, Final Office Action dated Jun. 9, 2011, 16 pgs.
U.S. Appl. No. 10/873,704, Non Final Office Action dated Jan. 5, 2011, 14 pgs.
U.S. Appl. No. 10/873,704, Non Final Office Action dated Mar. 23, 2009, 12 pgs.
U.S. Appl. No. 10/873,704, Non Final Office Action dated Sep. 16, 2009, 14 pgs.
U.S. Appl. No. 10/873,704, Non-Final Office Action dated Aug. 4, 2010, 7 pgs.
U.S. Appl. No. 10/873,704, Non-Final Office Action dated Jan. 15, 2008, 3 pgs.
U.S. Appl. No. 10/873,704, Non-Final Office Action dated Sep. 17, 2008, 15 pgs.
U.S. Appl. No. 10/873,704, Notice of Allowance dated Jan. 9, 2012, 8 pgs.
U.S. Appl. No. 10/873,704, Pre-Appeal Brief Request dated Sep. 9, 2011, 6 pgs.
U.S. Appl. No. 10/873,704, Response filed Dec. 16, 2009 to Non Final Office Action dated Dec. 16, 2009, 22 pgs.
U.S. Appl. No. 10/873,704, Response filed Dec. 17, 2008 to Non-Final Office Action dated Sep. 17, 2008; 18 pgs.
U.S. Appl. No. 10/873,704, Response filed Jul. 27, 2011 to Final Office Action dated Jun. 9, 2011, 23 pgs.
U.S. Appl. No. 10/873,704, Response filed Jun. 18, 2009 to Non Final Office Action dated Mar. 23, 2009, 23 pgs.
U.S. Appl. No. 10/873,704, Response filed Mar. 31, 2011 to Non-Final Office Action dated Jan. 5, 2011, 23 pgs.
U.S. Appl. No. 10/873,704, Response filed May 5, 2008 to Non-Final Office Action dated Jan. 15, 2008, 22 pgs.
U.S. Appl. No. 10/873,704, Response filed Oct. 28, 2010 to Non Final Office Action dated Aug. 4, 2010, 17 pgs.
U.S. Appl. No. 10/941,510 , Response filed Jun. 17, 2013 to Non Final Office Action dated Feb. 15, 2013, 10 pgs.
U.S. Appl. No. 10/941,510 Response filed Sep. 9, 2008 to Pre-Appeal Brief Decision mailed Jul. 9, 2008, 14 pgs.
U.S. Appl. No. 10/941,510, Advisory Action dated May 7, 2008, 3 pgs.
U.S. Appl. No. 10/941,510, Amendment Under 37 C.F.R. dated Sep. 9, 2008, 14 pgs.
U.S. Appl. No. 10/941,510, Decision on Appeal Brief mailed Jul. 9, 2008, 2 pgs.
U.S. Appl. No. 10/941,510, Decision on Pre-Appeal Brief dated Nov. 15, 2012, 2 pgs.
U.S. Appl. No. 10/941,510, Examiner Interview Summary dated Jun. 21, 2013, 3 pgs.
U.S. Appl. No. 10/941,510, Final Office Action dated Aug. 16, 2012, 10 pgs.
U.S. Appl. No. 10/941,510, Final Office Action dated Feb. 7, 2008, 9 pgs.
U.S. Appl. No. 10/941,510, Final Office Action dated Jun. 3, 2009; 9 pgs.
U.S. Appl. No. 10/941,510, Final Office Action dated May 13, 2010, 10 pgs.
U.S. Appl. No. 10/941,510, Non Final Office Action dated Feb. 15, 2013, 13 pgs.
U.S. Appl. No. 10/941,510, Non Final Office Action dated Jul. 10, 2007, 6 pgs.
U.S. Appl. No. 10/941,510, Non Final Office Action dated Oct. 7, 2011, 10 pgs.
U.S. Appl. No. 10/941,510, Non-Final Office Action dated Feb. 5, 2010, 10 pgs.
U.S. Appl. No. 10/941,510, Non-Final Office Action dated Oct. 6, 2008, 7 pgs.
U.S. Appl. No. 10/941,510, Notice of Allowance dated Oct. 23, 2013; 11 pgs.
U.S. Appl. No. 10/941,510, Notice of Allowance dated Oct. 9, 2013, 12 pgs.
U.S. Appl. No. 10/941,510, Notice of Non-Compliant Amendment dated Jun. 24, 2013, 3 pgs.
U.S. Appl. No. 10/941,510, Pre-Appeal Brief Request dated Jun. 5, 2008, 5 pgs.
U.S. Appl. No. 10/941,510, Pre-Appeal Brief Request mailed Oct. 12, 2012, 5 pgs.
U.S. Appl. No. 10/941,510, Response filed Apr. 28, 2010 to Non Final Office Action dated Feb. 5, 2010, 14 pgs.

(56) References Cited

OTHER PUBLICATIONS

U.S. Appl. No. 10/941,510, Response filed Apr. 7, 2008 to Final Office Action dated Feb. 7, 2008, 11 pgs.
U.S. Appl. No. 10/941,510, Response filed Apr. 9, 2012 to Non-Final Office Action dated Oct. 7, 2011, 15 pgs.
U.S. Appl. No. 10/941,510, Response filed Feb. 6, 2009 to Non Final Office Action dated Oct. 6, 2008, 11 pgs.
U.S. Appl. No. 10/941,510, Response filed Jul. 13, 2010 to Final Office Action dated May 13, 2010, 9 pgs.
U.S. Appl. No. 10/941,510, Response filed Jun. 28, 2013 to Notice of Non-Compliant Amendment dated Jun. 24, 2013, 10 pgs.
U.S. Appl. No. 10/941,510, Response filed Nov. 4, 2009 to Final Office Action dated Jun. 3, 2009, 14 pgs.
U.S. Appl. No. 10/941,510, Response filed Sep. 26, 2007 to Non-Final Office Action dated Jul. 10, 2007, 11 pgs.
U.S. Appl. No. 10/941,510; Advisory Action dated Aug. 5, 2010, Advisory Action, 3 pgs.
U.S. Appl. No. 11/618,700 Non-Final Office Action dated Oct. 4, 2010, 16 pgs.
U.S. Appl. No. 11/618,700, Advisory Action dated Mar. 1, 2012, 3 pgs.
U.S. Appl. No. 11/618,700, Advisory Action dated Mar. 26, 2009, 3 pgs.
U.S. Appl. No. 11/618,700, Appeal Brief filed Jun. 28, 2010, 29 pgs.
U.S. Appl. No. 11/618,700, Appeal Brief filed May 15, 2012, 26 pgs.
U.S. Appl. No. 11/618,700, Decision from Pre-Appeal Brief dated May 9, 2012, 2 pgs.
U.S. Appl. No. 11/618,700, Examiner Interview Summary dated Aug. 30, 2012, 2 pgs.
U.S. Appl. No. 11/618,700, Final Office Action dated Dec. 23, 2011, 12 pgs.
U.S. Appl. No. 11/618,700, Final Office Action dated Dec. 26, 2008, 18 pgs.
U.S. Appl. No. 11/618,700, Final Office Action dated Dec. 28, 2009, 16 pgs.
U.S. Appl. No. 11/618,700, Final Office Action dated Feb. 28, 2011, 17 pgs.
U.S. Appl. No. 11/618,700, Non Final Office Action dated Apr. 16, 2013, 12 pgs.
U.S. Appl. No. 11/618,700, Non Final Office Action dated Jun. 23, 2011, 19 pgs.
U.S. Appl. No. 11/618,700, Non Final Office Action dated Nov. 13, 2012, 12 pgs.
U.S. Appl. No. 11/618,700, Non-Final Office Action dated Jun. 30, 2008, 12 pgs.
U.S. Appl. No. 11/618,700, Non-Final Office Action dated May 29, 2009, 16 pgs.
U.S. Appl. No. 11/618,700, Notice of Allowance dated Nov. 14, 2013, 8 pgs.
U.S. Appl. No. 11/618,700, Pre-Appeal Brief Request for Review filed Mar. 15, 2012, 5 pgs.
U.S. Appl. No. 11/618,700, Response filed Dec. 21, 2010 to Non Final Office Action dated Oct. 4, 2010, 15 pgs.
U.S. Appl. No. 11/618,700, Response filed Feb. 11, 2013 to Non Final Office Action dated Nov. 13, 2012, 13 pgs.
U.S. Appl. No. 11/618,700, Response filed Feb. 26, 2009 to Final Office Action dated Dec. 26, 2008, 13 pgs.
U.S. Appl. No. 11/618,700, Response filed Feb. 9, 2012 to Final Office Action dated Dec. 23, 2011, 15 pgs.
U.S. Appl. No. 11/618,700, Response filed Jul. 16, 2013 to Non Final Office Action dated Apr. 16, 2013, 14 pgs.
U.S. Appl. No. 11/618,700, Response filed Mar. 1, 2003 to Final Office Action dated Dec. 28, 2009, 15 pgs.
U.S. Appl. No. 11/618,700, Response filed Mar. 1, 2010 to Final Office Action dated Dec. 28, 2009, 15 pgs.
U.S. Appl. No. 11/618,700, Response filed Mar. 26, 2009 to Advisory Action dated Mar. 26, 2009 and Final Office Action dated Dec. 26, 2008, 13 pgs.
U.S. Appl. No. 11/618,700, Response filed May 12, 2011 to Final Office Action dated Feb. 28, 2011, 15 pgs.
U.S. Appl. No. 11/618,700, Response filed May 26, 2009 to Final Office Action dated Mar. 26, 2009 14 pgs.
U.S. Appl. No. 11/618,700, Response filed May 26, 2009, 14 pgs.
U.S. Appl. No. 11/618,700, Response filed Sep. 23, 2011 to Non Final Office Action dated Jun. 23, 2011, 16 pgs.
U.S. Appl. No. 11/618,700, Response filed Sep. 29, 2009 to Non Final Office Action dated May 29, 2009, 15 pgs.
U.S. Appl. No. 11/618,700, Response filed Sep. 30, 2008 to Non Final Office Action dated Jun. 30, 2008, 13 pgs.
U.S. Appl. No. 11/873,704, Non-Final Office Action dated Mar. 23, 2009, 14 pgs.
U.S. Appl. No. 11/873,704, Response filed Jun. 18, 2009 to Non Final Office Action dated Mar. 23, 2009, 23 pgs.
U.S. Appl. No. 13/458,855, Final Office Action dated Jan. 31, 2014, 12 pgs.
U.S. Appl. No. 13/458,855, Final Office Action dated Jan. 7, 2015, 10 pgs.
U.S. Appl. No. 13/458,855, Non Final Office Action dated Aug. 1, 2014, 13 pgs.
U.S. Appl. No. 13/458,855, Non Final Office Action dated Jul. 17, 2015, 9 pgs.
U.S. Appl. No. 13/458,855, Non Final Office Action dated Jul. 30, 2013, 12 pgs.
U.S. Appl. No. 13/458,855, Notice of Allowance dated Jan. 12, 2016, 8 pgs.
U.S. Appl. No. 13/458,855, Response filed Apr. 30, 2014 to Final Office Action dated Jan. 31, 2014, 14 pgs.
U.S. Appl. No. 13/458,855, Response filed Dec. 2, 2013 to Non Final Office Action dated Jul. 30, 2013, 14 pgs.
U.S. Appl. No. 13/458,855, Response filed May 6, 2015 to Final Office Action dated Jan. 7, 2015, 28 pgs.
U.S. Appl. No. 13/458,855, Response filed Nov. 3, 2014 to Non Final Office Action dated Aug. 1, 2014, 15 pgs.
U.S. Appl. No. 13/458,855, Response filed Oct. 16, 2015 to Non Final Office Action dated Jul. 17, 2015, 23 pgs.
U.S. Appl. No. 14/189,113, Final Office Action dated Mar. 13, 2015, 15 pgs.
U.S. Appl. No. 14/189,113, Non Final Office Action dated Nov. 17, 2015, 18 pgs.
U.S. Appl. No. 14/189,113, Non Final Office Action dated Sep. 11, 2014, 11 pgs.
U.S. Appl. No. 14/189,113, Preliminary Amendment filed Mar. 10, 2014, 7 pgs.
U.S. Appl. No. 14/189,113, Response Filed Feb. 16, 2016 to Non Final Office Action dated Nov. 17, 2015, 19 pgs.
U.S. Appl. No. 14/189,113, Response filed Jan. 12, 2015 to Non Final Office Action dated Sep. 11, 2014, 20 pgs.
U.S. Appl. No. 14/189,113, Response filed Jun. 12, 2015 to Final Office Action dated Mar. 13, 2015, 27 pgs.
U.S. Appl. No. 14/207,401, Non Final Office Action dated Jul. 18, 2014, 9 pgs.
U.S. Appl. No. 14/207,401, Non Final Office Action dated May 7, 2014, 7 pgs.
Entire Prosecution History of U.S. Appl. No. 10/873,704, titled Method and System for Facilitating Merchant-Initiated Online Payments, filed Jun. 21, 2004.
Entire Prosecution History of U.S. Appl. No. 13/458,855, titled Method and System for Facilitating Online Payments Based on an Established Payment Agreement, filed Apr. 27, 2012.
Entire Prosecution History of U.S. Appl. No. 15/091,199, titled Method and System for Facilitating Online Payments Based on an Established Payment Agreement, filed Apr. 5, 2016.

* cited by examiner

HTTP://WWW.PAYMENT-PROVIDER.COM

ONLINE PAYMENT SERVICE PROVIDER

MERCHANT-INITIATED PAYMENTS – PAYMENT RELATIONSHIP CUSTOMIZATION
(Enter Maximum Monthly $ Amount)

| $250.00 | MERCHANT 1 – PAYMENT RELATIONSHIP |
| N/A | MERCHANT 2 – PAYMENT RELATIONSHIP |
| $100.00 | MERCHANT 3 – PAYMENT RELATIONSHIP |
| $75.00 | MERCHANT 4 – PAYMENT RELATIONSHIP |

METHOD AND SYSTEM FOR FACILITATING ONLINE PAYMENTS BASED ON AN ESTABLISHED PAYMENT AGREEMENT

RELATED APPLICATIONS

This application is a continuation of U.S. application Ser. No. 15/091,199, filed Apr. 5, 2016, and issues Apr. 10, 2018 as U.S. Pat. No. 9,940,622, which is a continuation of U.S. application Ser. No. 13/458,855, filed Apr. 27, 2012, now issued as U.S. Pat. No. 9,317,841, which is a continuation of U.S. application Ser. No. 10/873,704 filed Jun. 21, 2004, now issued as U.S. Pat. No. 8,175,938, and claims the benefit of the filing date of U.S. Provisional Patent Application No. 60/562,065, filed Apr. 13, 2004, all of which are incorporated in their entirety herein by reference.

FIELD OF THE INVENTION

The present invention relates generally to commerce automation. More particularly, the present invention relates to a method and system for facilitating online payments based on an established payment agreement.

BACKGROUND OF THE INVENTION

Electronic commerce ("e-commerce") has been increasing in popularity as more people are becoming accustomed to purchasing products online via the Internet. Such purchases can be facilitated through the use of a third-party, online payment service, such as the PayPal® online payment service, provided by PayPal® of San Jose, Calif. One problem with existing online payment services is that the customer must navigate away from the merchant's website to make a payment. For example, the customer must login to the payment service provider's website for each online payment the customer makes. The extra time spent logging into and navigating the payment service provider's website to make a payment is inconvenient, particularly when the purchase involves a small amount of money.

BRIEF DESCRIPTION OF THE DRAWINGS

The present invention is illustrated by way of example, and not by way of limitation, in the figures of the accompanying drawings, in which like references indicate similar elements, and in which.

DETAILED DESCRIPTION

A method and system for facilitating merchant-initiated online payments are described. In the following description, for purposes of explanation, numerous specific details are set forth in order to provide a thorough understanding of the present invention. It will be evident, however, to one skilled in the art that the present invention may be practiced without these specific details.

The present invention provides several advantages over prior payment methods and systems. In particular, the present invention provides a customer with a simpler and faster way to transact with merchants. According to one embodiment of the present invention, a customer initiates a merchant-initiated payment relationship with a merchant by navigating a series of web pages and providing the necessary information to establish the payment relationship. Once the payment relationship is in place, the customer can purchase goods and/or services from the merchant with the ease and simplicity of a single click to authorize a payment. Other features and advantages of the present invention will be apparent from the detailed description that follows.

Figure 1:
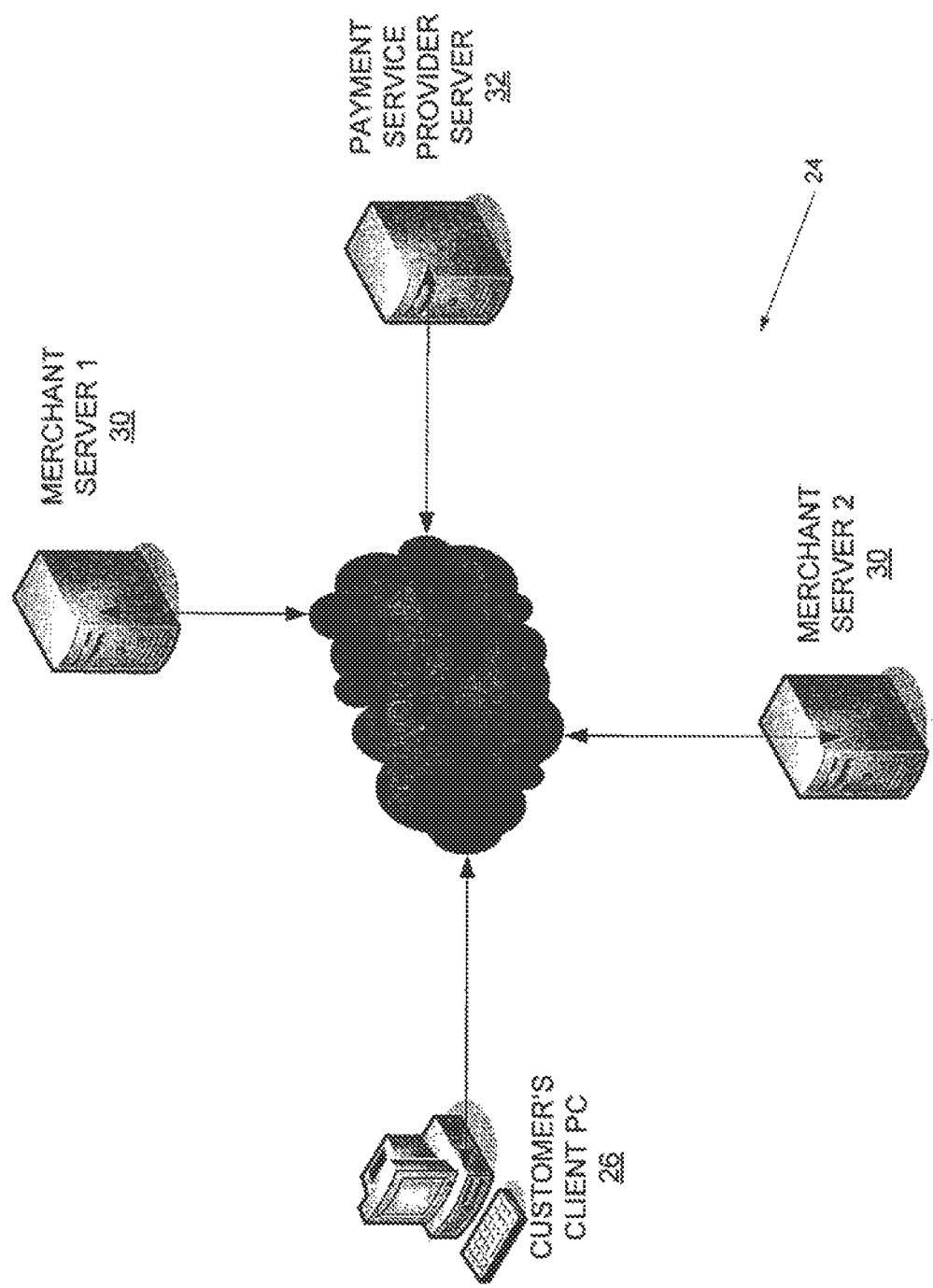
FIG. 1 is an exemplary client-server network diagram illustrating the relationship between a client PC, a merchant server and a payment service provider server, for one embodiment of the present invention.

FIG. 1 illustrates an example of a client-server network environment 24 in which the present invention might be implemented. In accordance with one embodiment of the present invention, and as illustrated in FIG. 1, a potential customer, or buyer, uses a client personal computer (PC) 26 connected to a network (e.g., the Internet 28) to interact with a merchant server 30 and a payment service provider's server 32. The client PC 26 will generally execute client software such as a web client (e.g., a browser, such as the Internet Explorer browser developed by Microsoft Corporation of Redmond, Wash. State) that enables the customer to browse web pages on the World Wide Web. In FIG. 1, the client 26 is illustrated as a PC. However, it will be appreciated that the client 26 could be any type of computing device including, but not limited to, a laptop, a handheld digital assistant, a mobile phone, or a point-of-sale terminal.

The merchant server 30 executes Internet server software including, but not limited to, web server software and Application Program Interface (API) server software. The web server software executing on merchant server 30 serves web pages to web clients, such as a web browser executing on client 26. The web pages provide an interface to a virtual store that customers can browse with the web browser software. While browsing the virtual store, customers can select items to purchase. The merchant server 30 temporarily stores items selected for purchase, which can be accessed for checkout by selecting a link to a virtual shopping cart.

The payment service provider's server 32 is connected to the client PC 26 and the merchant server 30 via the Internet 28. Like the merchant server 30, the payment service provider's server 32 also executes Internet server software including, but not limited to, web server software and API server software. For one embodiment of the present invention, to process a payment for the customer's selected items, the merchant server 30 interacts with the payment service provider's server 32 via an API protocol. For example, the API server software provides a programmatic interface allowing the merchant server 30 and the payment service provider's server 32 to communicate using standardized API calls. According to one embodiment of the present invention, a software development kit may be provided to each merchant that offers its customers the option to pay via the payment service provider. Consequently, before a customer enters into a payment relationship with a merchant, the merchant will generally already have established a relationship of its own with the payment service provider, and the merchant will have integrated the API functionality into its merchant server 30 to communicate with the payment service provider's server 32.

Entering into a Merchant-Initiated Payment Relationship

Figure 2:
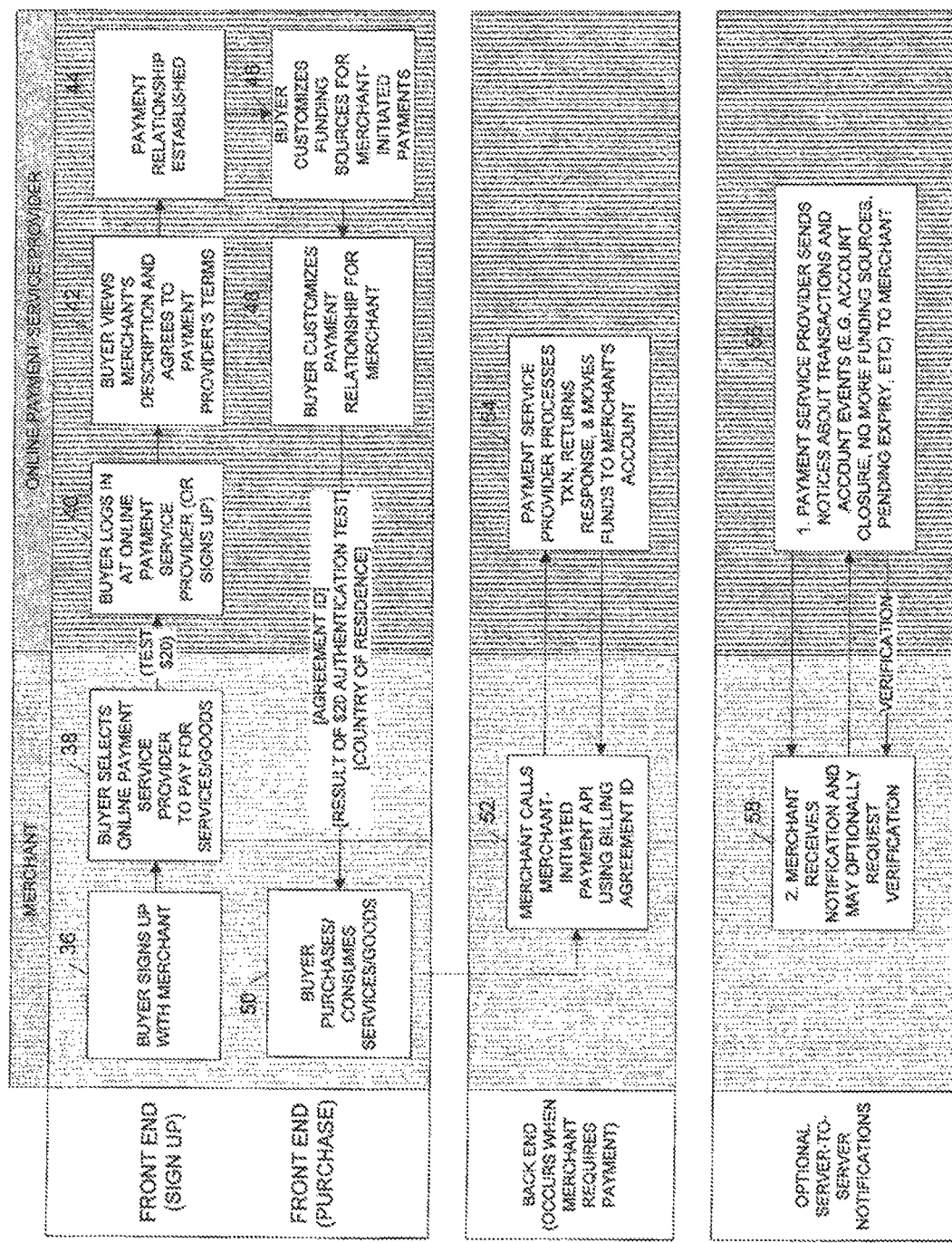
FIG. 2 illustrates a web-based flow, for one embodiment of the invention, of a method of initiating a payment relationship with a merchant for merchant-initiated "pull" payments.

FIG. 2 illustrates a web-based, sign-up flow for a payment relationship, for one embodiment of the present invention. Each of the actions, or operations, illustrated in FIG. 2 is presented in association with a different web page that is presented to the customer. However, it will be appreciated that each of the actions is only an example, and that multiple actions or operations could be combined or separated to occur in connection with one or more web pages presented to the customer.

For purposes of the invention, a merchant is any person or entity that is set up to receive payments in exchange for goods or services. For example, a merchant may include any seller, vendor, retailer, or person initiating an auction for goods or services. Once a customer has established an account, or signed up, with the merchant 36 and has selected goods and/or services to purchase, the customer may be presented with several payment options. For example, if the customer has a pre-existing merchant-initiated payment relationship with the merchant, the customer may be presented with the option to make a payment via the payment service provider using a merchant-initiated payment, the details of which will be described in detail below. However, if the customer does not yet have an existing merchant-initiated payment relationship with the merchant, the customer will be presented with an option to establish a merchant-initiated payment relationship with the merchant by selecting a "sign-up" button or link, directing the customer to the website of the payment service provider.

For one embodiment of the present invention, the communication between the merchant server 30 and the payment service provider server 32 is via API calls with standardized variables. For example, when the customer selects to establish a merchant-initiated payment relationship with the merchant 38 by clicking a "sign-up" link on the merchant's website, an API call is made from the merchant server 30 to the payment service provider server 32, requesting the establishment of a merchant-initiated payment relationship. In connection with the request, one or more data items may be communicated to the payment service provider server 32. The data items may include, but are not limited to the following:

| DATA ITEM NAME | DATA ITEM DESCRIPTION |
| --- | --- |
| BILLING_AGREEMENT_ID | A unique identification number for the payment relationship or billing agreement. |
| MERCHANT_NAME | The name of the business and/or an email address for the business. |
| SERVICE_DESCRIPTION | A brief description of the goods or service within the scope of the merchant-initiated payment relationship. |
| PAYMENT_TYPE | The type of payment required by the merchant. |
| TEST_AMOUNT | A currency amount to be tested against the customer's account. |
| CURRENCY_CODE | The default currency accepted by the business. |
| MAXIMUM | A default maximum currency amount authorized by the customer to be charged against his virtual wallet per month. |

-continued

| DATA ITEM NAME | DATA ITEM DESCRIPTION |
| --- | --- |
| MAXIMUM_EDIT | A binary value that indicates whether the maximum amount is customizable by the customer. |
| MINIMUM | A minimum amount that the customer will be charged per month. |
| IPN_URL | A server-to-server communication providing instant payment notifications. |

For one embodiment of the invention, the merchant server 30 may encrypt the data items before communicating the data items to the payment service provider's server 32. Additionally, for security reasons, the merchant server 30 may digitally sign the message associated with the API call so that the payment service provider's server 32 can verify the authenticity of the message when it is received.

After the customer has selected to establish a merchant-initiated payment relationship 38 with the merchant, the customer is redirected to a payment relationship initiation web page 40 hosted by the payment service provider's server 32. If, for example, the customer has a pre-existing account with the payment service provider, the customer may be asked to verify his identity by submitting the user credentials (e.g., username and/or password) associated with the customer's existing account. However, if the customer does not have a pre-existing account with the payment service provider, the customer may be asked to provide a username and password, as well as other information, to establish an account and to identify the customer as the holder of the account with the payment service provider.

In either case, the customer is presented with information about the merchant and the terms of the merchant-initiated payment relationship agreement with the payment service provider. For example, the terms of the agreement may be directly related to the data items communicated from the merchant server 30 to the payment service provider server 32. The terms may include the name of the payee to which payments will be made on behalf of the customer and the exact nature of the goods and/or service for which the customer authorizes the payment service provider to make payments. In addition, the agreement terms may include a default maximum or minimum amount that the customer authorizes to be paid to the merchant over a particular time period. For example, the agreement underlying the payment relationship may dictate that the payment service provider, on behalf of the customer, is authorized to pay merchant-initiated payment requests for a particular dollar amount per month. If the customer agrees with the terms of the agreement, the customer may indicate so, by clicking on a particular link, or button. In response, the customer may be presented with a web page confirming the establishment of the merchant-initiated payment relationship 44.

As will be discussed in greater detail below, the customer may be presented with the option to add, delete or customize funding sources 46 for the merchant-initiated payment relationship. For example, the customer may be given the option to add a new account (e.g., bank account or credit card account) to the customer's virtual wallet. In addition, the customer may be presented with the option to customize the terms of the payment relationship.

Authentication or Verification of Customer's Online Wallet Account

For one embodiment of the present invention, the merchant may process a test transaction against a customer's account (e.g., the customer's online wallet) during the establishment of the merchant-initiated payment relationship, or alternatively, at later time, for example, when the customer requests a payment. For example, for one embodiment of the invention, the merchant server 30 may communicate a test amount variable to the payment service provider server 32 along with a request to establish a merchant-initiated payment relationship. The payment service provider server 32 receives the test amount variable, and processes a verification payment using the payment service model. As a verification payment, the payment is processed for test purposes only, and not actually charged to the customer's account.

For one embodiment of the invention, the payment service provider server 32 communicates a response to the merchant server 30 indicating whether or not the test amount was successfully processed. For example, the response may be binary in nature, indicating a simple "yes" or "no." For one embodiment of the invention, if the test amount failed for some reason, an explanation for the failure is communicated to the merchant server 30 along with the response. For example, if the test fails because the customer's account has been restricted, or if the test amount exceeds the customer's available funds, or for any other reason, an explanation indicating the reason for the failure may be included in the response to the merchant server 30.

One advantage of the account verification procedure is that it allows a merchant to receive a simple binary response, for example, success or failure. This reduces the complexity of the logic required by other more complicated fraud scoring models. Additionally, in contrast to some credit card account verification procedures, a successful verification of the test amount is not synonymous with a guarantee of payment. The verification procedure is time sensitive in the sense that success or failure depends on the status of the customer's account at the time the test is run.

API for Making Merchant-Initiated Payment Requests

After a customer has established a merchant-initiated payment relationship with a particular merchant, the customer can transact with the merchant with the simple click of a button or link. For example, once a customer has selected one or more goods and/or services to purchase from a merchant's online store, the customer may select a link to pay via the payment service provider, using the established merchant-initiated payment relationship.

When the customer selects the link to use the merchant-initiated payment method, the merchant server 30 makes an API call to the payment service provider server 32 requesting a payment 52. For one embodiment of the invention, the request may include a number of data items related to the transaction. For example, for one embodiment of the invention, the data items may include, but not be limited to:

| DATA ITEM NAME | DATA ITEM DESCRIPTION |
| --- | --- |
| BILLING_AGREEMENT_ID | A unique identification number for the payment relationship or billing agreement. |
| AMOUNT | The currency amount of the payment requested. |
| PAYMENT_TYPE | The type of payment required by the merchant. |
| TEST_AMOUNT | A currency amount to be tested against the customer's account. |
| CURRENCY_CODE | The default currency accepted by the business. |
| TAX | The currency amount of tax to be charged. |
| SHIPPING | The currency amount to be charged for shipping. |

-continued

| DATA ITEM NAME | DATA ITEM DESCRIPTION |
| --- | --- |
| HANDLING | The currency amount to be charged for handling. |
| ITEM_DESCRIPTION | A description or identification number of the item purchased. |
| ITEM_NUMBER | The number of items purchased. |

For one embodiment of the invention, the merchant server 30 may encrypt the data items related to the transaction before communicating the data items to the payment service provider's server 32. Additionally, for security reasons, the merchant server 30 may digitally sign the message associated with the API call so that the payment service provider's server 32 can verify the authenticity of the message when it is received.

In response to the payment request, the payment service provider server 32 validates and processes the request. For one embodiment of the invention, the payment service provider server 32 performs several validation routines when it receives a payment request. For example, the payment service provider server 32 may validate the variables passed in by the merchant server 30 to ensure that all the required data has been received and is in the proper format. In addition, the payment service provider server 32 may ensure that the payment request is within the scope of the merchant-initiated payment relationship. For example, the payment service provider server 32 may ensure that the amount billed does not exceed a maximum amount that the customer has authorized for merchant-initiated payments under a merchant-initiated payment relationship with that particular merchant.

After validating the request, the payment service provider server 32 processes the request. For one embodiment of the invention, the payment service provider server 32 performs several routines when processing the request. For example, the payment service provider server 32 may analyze or calculate a shipping profile and/or tax profile for the transaction. Additionally, the payment service provider server 32 may perform a funding source analysis to select the proper funding source for the transaction. For example, the customer may have selected a preferred funding source for the particular merchant-initiated payment relationship. If so, the payment service provider server 32 may attempt to process the transaction using the preferred funding source before falling back to a default funding source.

For one embodiment of the invention, the payment service provider server 32 always attempts to process the transaction with funds held in an account with the payment service provider (e.g., an internally held account), and only uses a customer-selected preferred or secondary account (e.g., an externally linked account, such as a bank or credit card account) if there are insufficient funds in the internally held account. For one embodiment of the invention, the payment service provider server 32 will continue attempting to process the payment if the transaction is unsuccessful using one or more accounts. For example, the payment service provider server 32 will proceed to use accounts, in a default order, or an order specified by the customer, to attempt processing the transaction until it has been unsuccessful with every account in the customer's virtual wallet. At that time, the payment service provider server 32 will communicate a failure message to the merchant server 30 via an API call. The API call may specify the reason for the failure.

In an alternative embodiment, the payment service provider server will report a failure to the merchant server 30 after a first attempt to process the transaction has failed. The message to the merchant server 30 may indicate a reason for the failure, and the merchant server 30 may request a second attempt using a different account, or combination of accounts in the virtual wallet.

In any case, the response communicated to the merchant server 30 is synchronous in nature. In addition to a synchronous response, the payment service provider server 32 may communicate an asynchronous response. For example, an instant payment notification (IPN) may be communicated to the merchant server 30 at a later time if, for example, the synchronous response was not communicated due to a network problem, or, if there was a delay in processing the payment using a particular account.

Another advantage of the API is the ease with which it can be implemented by a third party. For example, for one embodiment of the invention, a third-party may implement the API to provide payment processing on behalf of the merchant. The API allows the third party to seamlessly integrate payment processing for the merchant with limited work and adaptation from the merchant.

Selection of the Funding Source for Payments

One of the advantages of the present invention is that the customer is provided with significant flexibility in customizing funding sources for payments on a per merchant basis. For example, for each merchant-initiated payment relationship the customer enters into, the customer has the ability to customize the funding source to be used for paying that particular merchant. This flexibility allows the customer to 1) select different funding sources for different merchants, 2) select preferred funding sources for particular merchants, and/or 3) disable funding sources for particular merchants.

Figure 3:
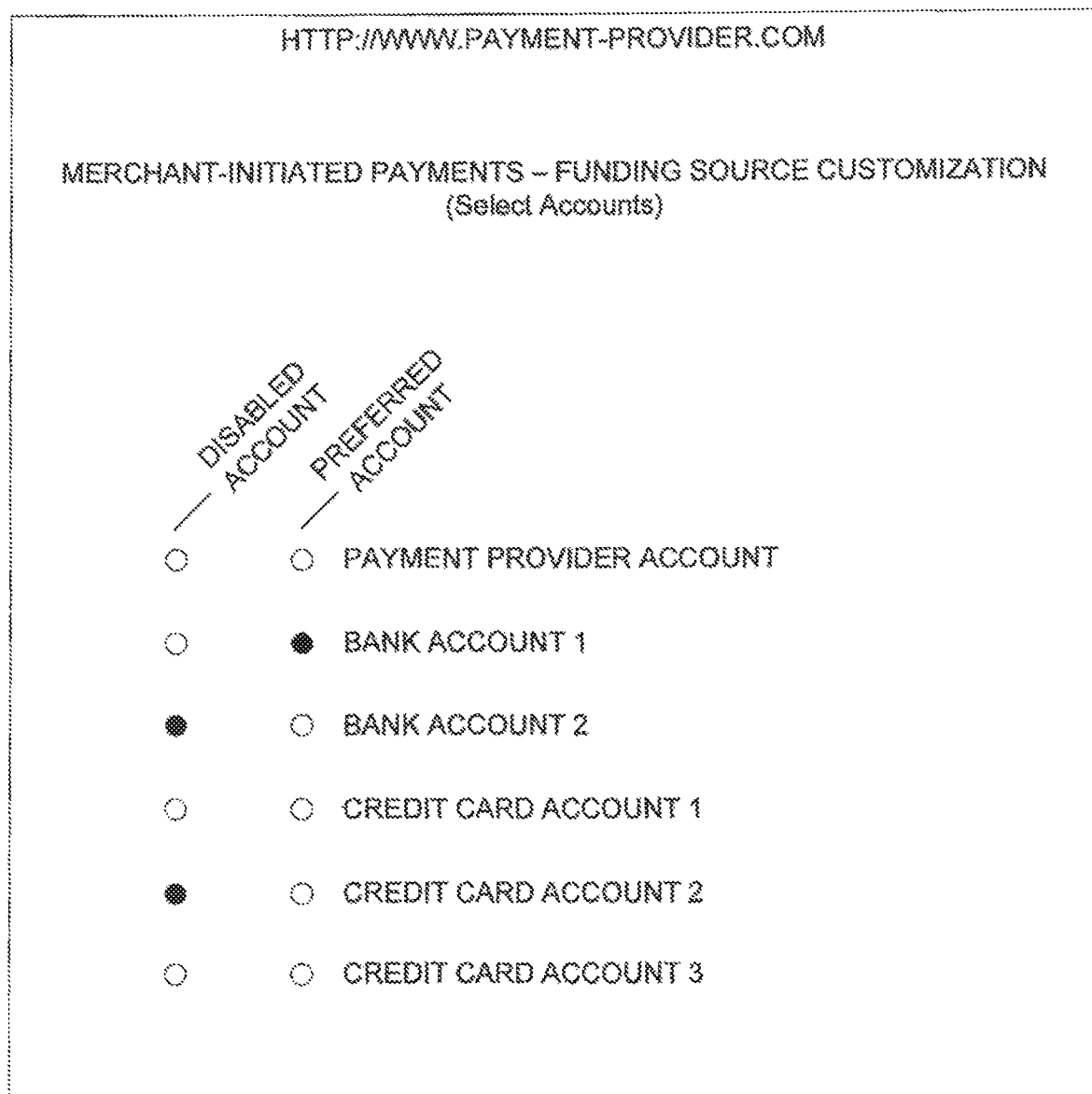
FIG. 3 illustrates an example of a web page for customizing the funding sources of a merchant-initiated payment relationship.

For one embodiment of the invention, the customer may be presented with a funding source customization web page, such as the example web page illustrated in FIG. 3. The funding source customization web page 62 may be presented to the customer at the time the merchant-initiated payment relationship is established, as illustrated by the web-based action with reference number 46 in FIG. 2. Alternatively, the funding source customization web page 62 may be accessed via the payment service provider's home website at a later time as part of a profile setting for the customer.

The funding source customization web page 62 allows the customer to select a preferred funding source (e.g., bank, credit card, or other account) from which payments should be processed for transactions with the merchant that are associated with the merchant-initiated payment relationship. In addition, the customer may disable certain funding sources for a particular merchant-initiated payment relationship. For one embodiment of the invention, the customer is given the option of ranking or ordering all the accounts in the customer's virtual wallet. Furthermore, for one embodiment, the payment service provider server 32 may select a certain account as the default account and always attempt to use this default account first.

Customer's Customization of the Merchant Agreement

One advantage of the present invention is the control that the customer is provided in relation to customizing the payment relationship. For example, not only can the customer control the funding sources on a per merchant basis, as described above, but the customer is also given the ability to set maximum payment amounts on a per merchant basis. For example, the customer may set a maximum payment amount that a particular merchant can charge under a merchant-initiated payment relationship.

Figure 4:
FIG. 4 illustrates an example of a web page for customizing a merchant-initiated payment relationship.

For one embodiment of the invention, the customer may be presented with a payment relationship customization web page 64, such as the example web page illustrated in FIG. 4. The payment relationship customization web page 64 may be presented to the customer at the time the merchant-initiated payment relationship is established, as illustrated by the web-based action with reference number 48 in FIG. 2. Alternatively, the payment relationship customization web page 64 may be accessed via the payment service provider's home website at a later time as part of a profile setting for the customer.

For one embodiment of the present invention, the customer is able to set maximum payment amounts on a monthly basis per merchant-initiated relationship, as illustrated in FIG. 4. For example, for one embodiment of the invention, the customer is able to set a maximum dollar amount that the payment service provider is authorized to pay a particular merchant in a given month, on behalf of the customer. Alternatively, the maximum amount could be for a given time period other than a month, for example, a maximum per week, quarter, or year. In addition, for one embodiment of the invention, the customer is able to set a maximum payment amount for a single transaction and/or a maximum number of transactions for a given time period. For example, for a specific merchant-initiated payment relationship, the customer might select to set the maximum number of transactions in a given month to five, the maximum payment amount for any single transaction to $50, and the maximum payment amount for a single month to $200. Consequently, the customer is given great flexibility For one embodiment of the invention, each merchant determines whether the customer should have control over setting any maximum amounts. For example, as illustrated in FIG. 4, merchant 2 does not allow a maximum amount to be controlled by the customer.

Merchant Notifications

Another advantage of the present invention is the merchant notifications that are communicated asynchronously from the payment service provider's server to each merchant server 30. For example, as illustrated in FIG. 2, the payment service provider server 32 may on occasion communicate messages 56 to a merchant server 30 with updates on the status of a particular merchant-initiated payment relationship. Additionally, the merchant server 30 may request verification 58 of a particular notification message that the merchant server 30 receives. For example, if a customer closes his account with the payment service provider, the payment service provider server 32 may notify the merchant server 30. Consequently, the merchant server 32 will be able to discontinue presenting the payment service provider as a payment option at the merchant's checkout web page for the customer. In addition, notifications may be sent to the merchant server if, for example, a linked account (e.g., a credit card account) in the customer's virtual wallet expires or is otherwise cancelled.

Figure 5:
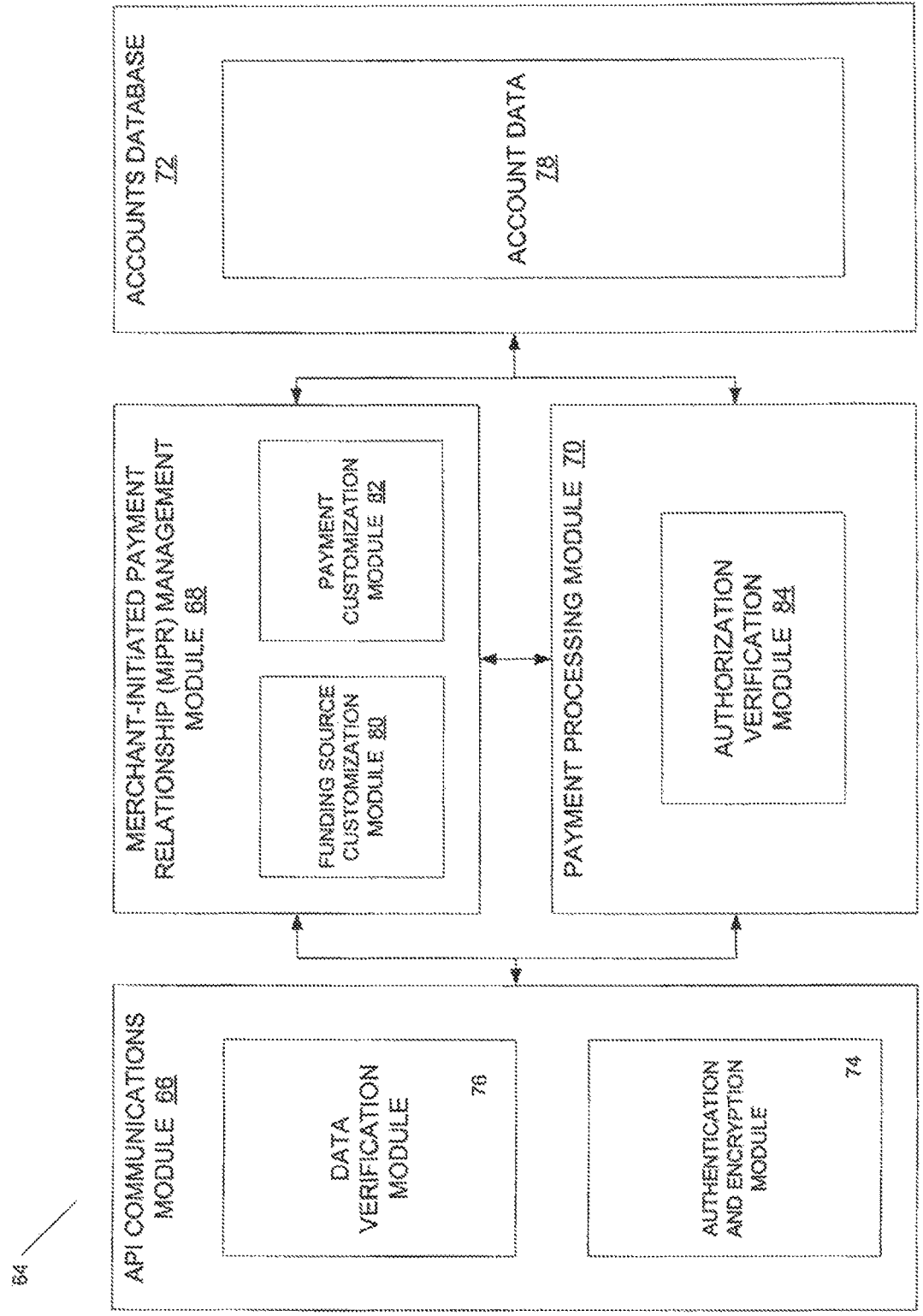
FIG. 5 illustrates a system to facilitate merchant-initiated electronic payments.

FIG. 5 illustrates a system 64, consistent with one embodiment of the invention, to facilitate merchant-initiated electronic payments. The system includes an Application Programming Interface (API) communications module 66, a merchant-initiated payment relationship management module 68, a payment processing module 70, and an accounts database 72. For one embodiment of the invention, the system receives requests to establish merchant-initiated payment relationships, or agreements, as well as requests for payment under previously established relationships, or agreements.

Using one of a variety of standardized protocols, the API communications module 66 receives API messages from a merchant server. The API messages may include any number of pre-defined data items, such as those in the charts shown above with respect to the description of FIG. 2. For one embodiment of the invention, after receiving an API message, the API communications module authenticates, decrypts and verifies the message.

For example, for one embodiment of the invention the API communications module includes an authentication and encryption module 74 that may authenticate and decrypt the message. For example, the authentication and encryption module 74 may check a digital signature included with the message to determine whether the message is from a trusted source, such as a merchant server with a proper digital signature key. Next, the authentication and encryption module 74 may decrypt the message, if the merchant server that sent the message originally encrypted it.

Next, a data verification module 76 may verify the data items included in the message. For example, if the message is a request to establish a merchant-initiated payment relationship, then the data verification module 76 may verify that the request includes all of the data items required for such a request. Furthermore, the data verification module 76 may verify that the data items received with the request are of the proper type and format. For example, the data verification module 76 may check a data item to determine whether it is a number or character, and whether it has the proper length. If a data field is invalid for any reason, the API communications module 66 may reject the message and/or send a reply message notifying the sender of the original message that one or more data items were invalid.

For one embodiment of the present invention, the merchant-initiated payment relationship management module 68 manages the formation and administration of merchant-initiated payment relationships and accounts to which each relationship is linked. For example, the management module 68 processes requests to establish new merchant-initiated payment relationships, and links each established relationship to the account of a payment service provider account holder. For example, as illustrated in FIG. 5, an account holder may establish several merchant-initiated payment relationships with a wide variety of merchants. The management module 68 establishes each merchant-initiated payment relationship and links the data associated with each relationship to the account data 78 associated with the user's account held in an accounts database 72.

In addition, for one embodiment of the invention, the management module 68 includes a funding source customization module 80 and a payment customization module 82. The funding source customization module 80 allows a user to customize a funding source for a particular merchant-initiated payment relationship. For example, for one embodiment of the invention, the funding source customization module 80 facilitates the adding and deleting of funding sources for a user account or merchant-initiated payment relationship. Furthermore, the funding source customization module 80 may facilitate the presentation of funding sources to a user, and the reception of funding source selections from the user, including a preferred funding source (e.g., a particular bank account or credit card account) selected by a user. Consequently, when a payment request is received under a particular merchant-initiated payment relationship and processed, the payment processing module 70 will attempt to use funding sources in the order specified by the user.

For one embodiment of the invention, the management module also includes a payment customization module 72. The payment customization module facilitates the customization of terms of the merchant-initiated payment relationships. For example, the payment customization module 82 provides the logic to present users with the option of setting maximum payment amounts. For one embodiment of the invention, the payment customization module customizes the payment relationship on a per merchant basis, by providing the user with the ability to set a maximum payment amount per transaction, or a maximum payment amount for a predetermined period of time (e.g., maximum total payments per a given month). Additionally, the payment customization module may provide the user with the ability to limit the total number of payment requests that are processed for a particular merchant in a given time period. For example, the user may be able to limit a merchant to making one payment request per month.

Prior to processing a payment in connection with a payment request, the payment processing module 70 may perform a verification process to verify that the user has properly authorized a payment in connection with the particular terms of a payment request. For example, the authorization verification module 84 of the payment processing module 70 may verify that the payment processor has been properly authorized by the user to make a payment in connection with the payment request. In addition to checking or verifying payment limits set by the user using the payment customization module 82, the authorization verification module 84 may verify that the particular product or service associated with the payment request received from the merchant is a product or service that has been authorized for merchant-initiated payments under the merchant-initiated payment relationship.

Figure 6:
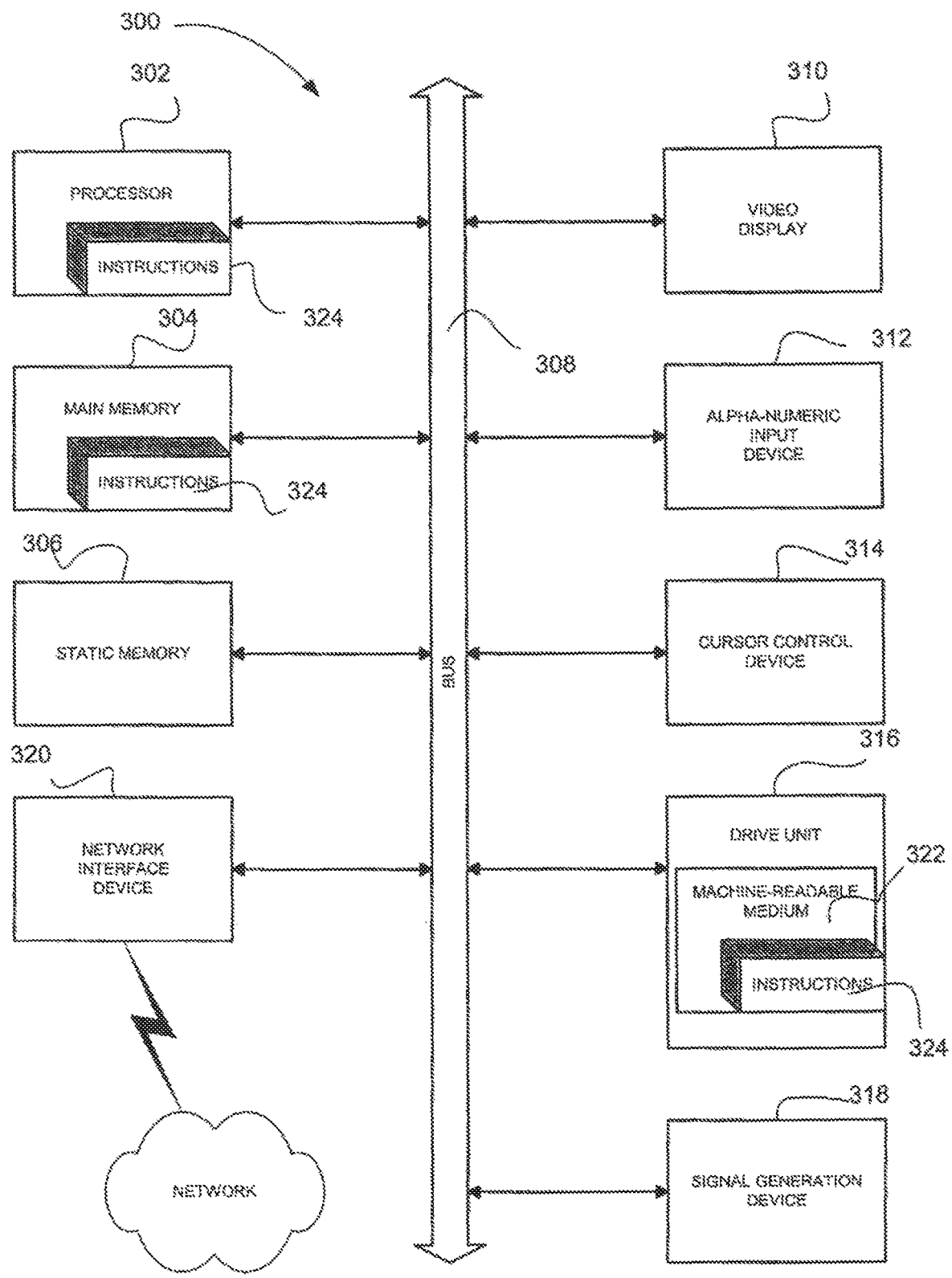
FIG. 6 shows a diagrammatic representation of a machine in the exemplary form of a computer system within which a set of instructions, for causing the machine to perform any one or more of the methodologies discussed herein, may be executed.

FIG. 6 shows a diagrammatic representation of a machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer, or distributed, network environment. The machine may be a server computer, a client computer, a PC, a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU) a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions (e.g., software 324) embodying any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media. The software 324 may further be transmitted or received over a network 326 via the network interface device 320.

While the machine-readable medium 392 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, the present invention provides a method and system for facilitating merchant-initiated online payments. Accordingly, a merchant is provided with the means to "pull" funds from a customer's account with a payment service provider on an as-needed basis, as opposed to a regular schedule as with a subscription-type service. Before the merchant is allowed to "pull" funds from the customer's account, the customer will first indicate that the customer would like to establish the merchant-initiated payment relationship with the merchant, via a series of web pages hosted by the payment service provider. The ability to customize the payment relationship agreement on a per merchant basis provides the customer with a certain level of security and protection. For example, the customer is allowed to set preferred funding sources and set maximum payment amounts (e.g., maximum dollars per month, or per transaction) on a per merchant basis. This customization is advantageous to the customer because it protects the customer from potential funds overdrafts and credit limit overruns. Additionally, the customization feature is beneficial to the merchants because it limits the likelihood of disputes and chargebacks.

Thus, a method and system are provided with reference to specific exemplary embodiments. It will be evident that various modifications and changes may be made to theses embodiments without departing from the broader spirit and scope of the invention. Accordingly, the specification and drawings are to be regarded in an illustrative rather than a restrictive sense.

What is claimed is:

1. A method comprising:
    receiving, at a payment service provider server of a payment service provider that is distinct from a merchant server of a merchant, a payment request associated with a transaction between a user and the merchant, the payment request being received from the merchant server in response to the user making a particular user selection on a user interface of a merchant site provided by the merchant server; and
    automatically and without requiring user intervention, processing, by the payment service provider server, the payment request to cause transfer of funds to a merchant account, the receiving of the payment request and the processing of the payment request both being in response to the particular user selection and being performed on the user interface of the merchant site without directing the user to a service provider site of the payment service provider such that the payment request is received and processed by the payment service provider server based on user interaction with the merchant site instead of being based on user interaction with the service provider site.

2. The method of claim 1, wherein the method further includes:
    verifying, by the payment service provider server, that the payment request complies with terms of a payment agreement established between the merchant and the user; and
    wherein the processing of the payment request is in response to verifying that the payment request complies with the terms of the payment agreement.

3. The method of claim 2, further comprising identifying the payment agreement for the verifying using a unique identifier included in the payment request.

4. The method of claim 2, wherein the payment agreement defines terms including an authority granted by the user to the payment service provider to make payments to the merchant on behalf of the user.

5. The method of claim 2, wherein the verifying that the payment request complies with the terms of the payment agreement includes performing one or more verification operations selected from a group of verification operations consisting of:
    verifying that processing the payment request does not exceed an authority granted by the user;
    verifying that processing the payment request would not exceed a maximum payment amount set by the user;
    verifying that processing the payment request would not exceed a maximum number of payment requests processed over a predetermined time period;
    verifying that the payment request is in connection with a product or service for which the payment service provider is authorized to make a payment; and
    verifying that the payment request is in connection with a product or service for which the payment service provider is authorized to make a payment.

6. The method of claim 2, further comprising:
    receiving, at the payment service provider server a relationship request to establish, at the payment service provider server, the payment agreement between the merchant and the user prior to any transactions between the merchant and the user; and
    establishing the payment agreement between the merchant and the user, the establishing of the payment agreement comprising linking the payment agreement with one or more accounts selected from a group of accounts consisting of: the merchant account of the merchant; and a user account of the user.

7. The method of claim 6, wherein the relationship request is received in response to a selection by the user of a link to establish the payment agreement on an interface presented on a device of the user.

8. A system comprising:
    one or more machine readable media having instructions stored thereon; and
    one or more hardware processors configured to, in response to execution of the instructions, cause the system to perform operations comprising:

receiving, at a payment service provider server of a payment service provider that is distinct from a merchant server of a merchant a payment request associated with a transaction between a user and the merchant, the payment request being received from the merchant server in response to the user making a particular user selection on a user interface of a merchant site provided by the merchant server; and automatically and without requiring user intervention, attempting to process, by the payment service provider server, the payment request to cause transfer of funds to a merchant account of the merchant, the receiving of the payment request and the attempting to process the payment request both being in response to the particular user selection and being performed on the user interface of the merchant site without directing the user to a service provider site of the payment service provider such that the payment request is received and attempted for processing by the payment service provider server based on user interaction with the merchant site instead of being based on user interaction with the service provider site.

9. The system of claim 8, wherein the operations further include:

verifying, by the payment service provider server, that the payment request complies with terms of a payment agreement established between the merchant and the user; and wherein the attempting to process the payment request is in response to verifying that the payment request complies with the terms of the payment agreement.

10. The system of claim 9, wherein the operations further comprise identifying the payment agreement for the verifying using a unique identifier included in the payment request.

11. The system of claim 9, wherein the payment agreement defines terms including an authority granted by the user to the payment service provider to make payments to the merchant on behalf of the user.

12. The system of claim 9, wherein the verifying that the payment request complies with the terms of the payment agreement includes performing one or more verification operations selected from a group of verification operations consisting of:

verifying that processing the payment request does not exceed an authority granted by the user;

verifying that processing the payment request would not exceed a maximum payment amount set by the user;

verifying that processing the payment request would not exceed a maximum number of payment requests processed over a predetermined time period;

verifying that the payment request is in connection with a product or service for which the payment service provider is authorized to make a payment; and verifying that the payment request is in connection with a product or service for which the payment service provider is authorized to make a payment.

13. The system of claim 9, wherein the operations further comprise:

receiving, at the payment service provider server a relationship request to establish, at the payment service provider server, the payment agreement between the merchant and the user prior to any transactions between the merchant and the user; and establishing the payment agreement between the merchant and the user, the establishing of the payment agreement comprising linking the payment agreement with one or more accounts maintained at the payment service provider selected from a group of accounts consisting of:

the merchant account of the merchant; and a user account of the user.

14. The system of claim 9, wherein the operations further comprise, in response to the attempt being unsuccessful, sending a notification to the merchant server indicating that the attempt was unsuccessful.

15. One or more non-transitory machine-readable media having instructions stored thereon that, in response to execution by one or more hardware processors, cause a system to perform operations, the operations comprising:

receiving, at a payment service provider server of a payment service provider that is distinct from a merchant server of a merchant, a payment request associated with a transaction between a user and the merchant, the payment request being received from the merchant server in response to the user making a particular user selection on a user interface of a merchant site provided by the merchant server;

verifying, by the payment service provider server, that the payment request complies with terms of a payment agreement established between the merchant and the user; and in response to verifying that the payment request complies with the terms of the payment agreement, automatically and without requiring user intervention, processing, by the payment service provider server, the payment request to cause transfer of funds to a merchant account, the receiving of the payment request, the verifying of the payment request, and the processing of the payment request all being in response to the particular user selection and being performed on the user interface of the merchant site without directing the user to a service provider site of the payment service provider such that the payment request is received, verified, and processed by the payment service provider server based on user interaction with the merchant site instead of being based on user interaction with the service provider site.

16. The machine-readable media of claim 15, wherein the operations further comprise identifying the payment agreement for the verifying using a unique identifier included in the payment request.

17. The machine-readable media of claim 15, wherein the payment agreement defines terms including an authority granted by the user to the payment service provider to make payments to the merchant on behalf of the user.

18. The machine-readable media of claim 15, wherein the verifying that the payment request complies with the terms of the payment agreement includes performing one or more verification operations selected from a group of verification operations consisting of:

verifying that processing the payment request does not exceed an authority granted by the user;

verifying that processing the payment request would not exceed a maximum payment amount set by the user;

verifying that processing the payment request would not exceed a maximum number of payment requests processed over a predetermined time period;

verifying that the payment request is in connection with a product or service for which the payment service provider is authorized to make a payment; and verifying that the payment request is in connection with a product or service for which the payment service provider is authorized to make a payment.

19. The machine-readable media of claim 15, wherein the operations further comprise:

receiving, at the payment service provider server a relationship request to establish, at the payment service provider server, the payment agreement between the merchant and the user prior to any transactions between the merchant and the user; and establishing the payment agreement between the merchant and the user, the establishing of the payment agreement comprising linking the payment agreement with one or more accounts selected from a group of accounts consisting of: the merchant account of the merchant; and a user account of the user.

20. The machine-readable media of claim 19, wherein the relationship request is received in response to a selection by the user of a link to establish the payment agreement on an interface presented on a device of the user.

* * * * *